(12) United States Patent
Scott et al.

(10) Patent No.: US 7,760,073 B2
(45) Date of Patent: Jul. 20, 2010

(54) RFID TAG MODIFICATION FOR FULL DEPTH BACKSCATTER MODULATION

(75) Inventors: Jeffrey Wayne Scott, Pasco, WA (US); Richard M. Pratt, Richland, WA (US)

(73) Assignee: Battelle Memorial Institute, Richalnd, WA (US)

( * ) Notice: Subject to any disclaimer, the term of this patent is extended or adjusted under 35 U.S.C. 154(b) by 1599 days.

(21) Appl. No.: 11/029,841

(22) Filed: Jan. 4, 2005

(65) Prior Publication Data
US 2006/0145819 A1 Jul. 6, 2006

(51) Int. Cl.
*H04Q 5/22* (2006.01)
(52) U.S. Cl. .................. 340/10.1; 340/10.4; 340/10.42; 340/572.1
(58) Field of Classification Search .............. 340/10.1, 340/10.4, 10.42, 572.1; 455/106, 107
See application file for complete search history.

(56) References Cited

U.S. PATENT DOCUMENTS

| | | | | |
|---|---|---|---|---|
| 5,105,190 | A * | 4/1992 | Kip et al. ................. | 340/10.34 |
| 5,260,701 | A * | 11/1993 | Guern et al. ............. | 340/10.34 |
| 6,636,146 | B1 * | 10/2003 | Wehoski .................... | 340/10.4 |
| 6,738,025 | B2 | 5/2004 | Carrender ................... | 343/860 |
| 6,745,008 | B1 | 6/2004 | Carrender et al. .......... | 455/41.1 |
| 6,765,476 | B2 | 7/2004 | Steele et al. ............... | 340/10.4 |
| 7,253,718 | B2 * | 8/2007 | Cantatore ................... | 340/10.4 |
| 2002/0149468 | A1 | 10/2002 | Carrender et al. .......... | 340/5.61 |
| 2002/0149484 | A1 | 10/2002 | Carrender ................. | 340/572.4 |
| 2004/0066278 | A1 | 4/2004 | Hughes et al. ............. | 340/10.1 |
| 2004/0066279 | A1 | 4/2004 | Hughes et al. ............. | 340/10.1 |
| 2004/0066280 | A1 * | 4/2004 | Pratt et al. .................. | 340/10.2 |
| 2004/0066281 | A1 | 4/2004 | Hughes et al. ............. | 340/10.2 |
| 2004/0066752 | A1 | 4/2004 | Hughes et al. ............. | 370/252 |
| 2004/0067764 | A1 | 4/2004 | Pratt et al. .................. | 455/502 |
| 2004/0070500 | A1 | 4/2004 | Pratt et al. ............... | 340/572.1 |
| 2004/0198222 | A1 | 10/2004 | Ertin et al. ................. | 455/41.1 |
| 2004/0198233 | A1 | 10/2004 | Pratt et al. ............... | 455/67.11 |
| 2004/0203478 | A1 | 10/2004 | Scott .......................... | 455/70 |

OTHER PUBLICATIONS

U.S. Appl. No. 10/589,001, filed Jun. 6, 2000, R. W. Gilbert et al.
U.S. Appl. No. 09/588,997, filed Jun. 6, 2000, R. W. Gilbert et al.
U.S. Appl. No. 09/588,998, filed Jun. 6, 2000, C. L. Carrender et al.

* cited by examiner

*Primary Examiner*—Edwin C Holloway, III
(74) *Attorney, Agent, or Firm*—Wells St. John, P.S.

(57) ABSTRACT

A modulated backscatter radio frequency identification device includes a diode detector configured to selectively modulate a reply signal onto an incoming continuous wave; communications circuitry configured to provide a modulation control signal to the diode detector, the diode detector being configured to modulate the reply signal in response to be modulation control signal; and circuitry configured to increase impedance change at the diode detector which would otherwise not occur because the diode detector rectifies the incoming continuous wave while modulating the reply signal, whereby reducing the rectified signal increases modulation depth by removing the reverse bias effects on impedance changes. Methods of improving depth of modulation in a modulated backscatter radio frequency identification device are also provided.

26 Claims, 3 Drawing Sheets

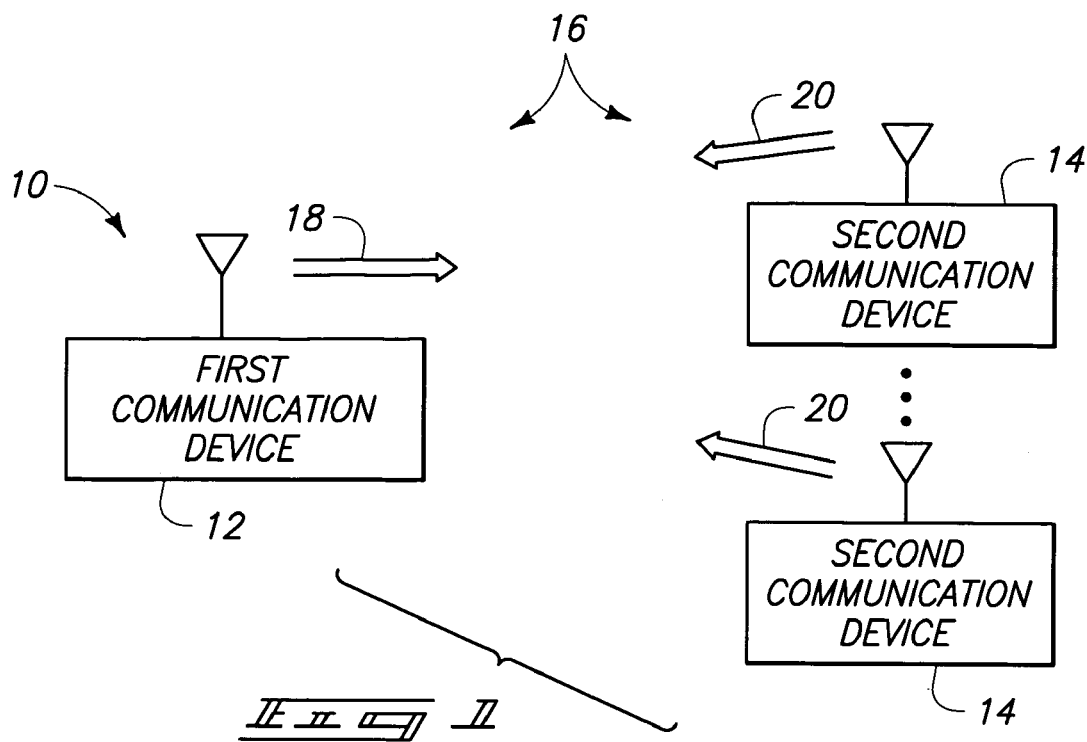
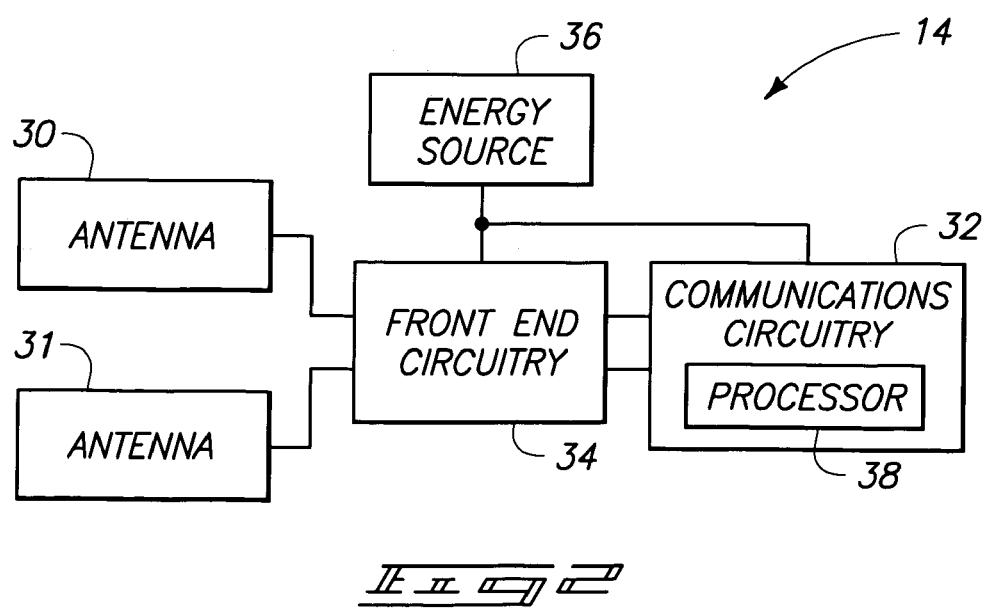

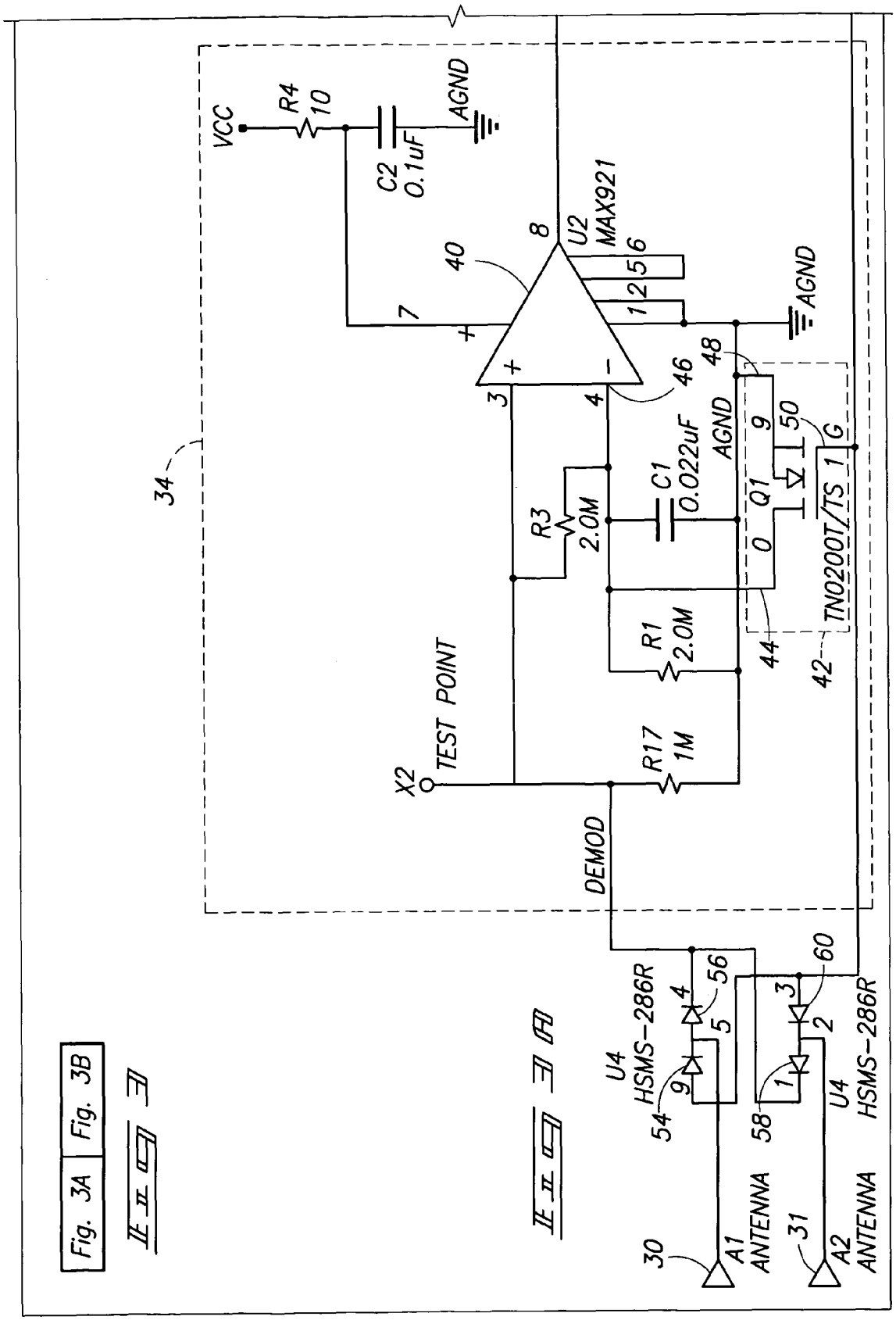

RFID TAG MODIFICATION FOR FULL DEPTH BACKSCATTER MODULATION

GOVERNMENT RIGHTS STATEMENT

This invention was made with Government support under Contract DE-AC0676RL01830 awarded by the U.S. Department of Energy. The Government has certain rights in the invention.

TECHNICAL FIELD

The invention relates to wireless communications systems, radio frequency identification devices, wireless communications methods, and radio frequency identification device communications methods.

BACKGROUND OF THE INVENTION

Remote wireless communications may be implemented using radio frequency (RF) technology. Exemplary applications utilizing RF technology include identification applications including, for example, locating, identifying, and tracking of objects. Radio frequency identification device (RFID) systems have been developed to facilitate identification operations. For example, one device may be arranged to output and receive radio frequency communications and one or more remotely located devices may be configured to communicate with the one device using radio frequency communications. The remotely located device(s) may be referred to as a tag, while the other device may be referred to as a reader. Some advantages of radio frequency communications of exemplary radio frequency identification device systems include an ability to communicate without contact or line-of-sight, at relatively fast speeds, and with robust communication channels.

The assignee of the present invention develops RFID backscatter tags that can be read at extremely long ranges. Various designs are disclosed in patent documents listed below. Some prior RFID tag front end designs have been a compromise between tag receive sensitivity and the quality of backscatter modulation the tag was able to produce due to the choice of the front end component values. For superior tag receive sensitivity, the tag has not been able to produce full depth modulation in some designs. When the tag cannot produce full depth modulation for the length of its entire response to the reader, the tag cannot be read at the maximum distance that would be possible if it did produce full depth modulation for the length of its response. It would be desirable to find a solution to this problem.

SUMMARY OF THE INVENTION

Aspects of the invention provide the addition of a single component to front end circuitry of a radio frequency identification device, which enables full depth modulation for the entire length of the tags' backscattered response message back to the reader.

Other aspects of the invention provide a modulated backscatter radio frequency identification device comprising a diode detector configured to selectively modulate a reply signal onto an incoming continuous wave; communications circuitry configured to provide a modulation control signal to the diode detector, the diode detector being configured to modulate the reply signal in response to be modulation control signal; and circuitry configured to increase impedance change at the diode detector. The detector diode impedance change is reduced when the diode detector rectifies the incoming continuous wave while modulating the reply signal, whereby reducing the rectified signal increases impedance change by removing the reverse bias effects.

Yet other aspects of the invention provide a method of improving depth of modulation in a modulated backscatter radio frequency identification device including a diode detector configured to selectively modulate a reply signal onto an incoming continuous wave and communications circuitry configured to provide a modulation control signal to the diode detector, the diode detector being configured to modulate the reply signal in response to the modulation control signal, the method comprising increasing impedance change at the diode detector. The depth of modulation is a function of the impedance change whereby increasing the diode detector's impedance change also increases the depth of modulation and the range at which the tag's response can be read. This would otherwise not occur because the diode detector rectifies the incoming continuous wave while modulating the reply signal, whereby reducing the rectified signal increases modulation depth by removing the reverse bias effects on impedance changes.

Still other aspects of the invention provide a modulated backscatter radio frequency identification device comprising an antenna; a diode detector coupled to the antenna, for use in receiving radio frequency data from a reader and in replying to the interrogator by modulating a reply signal onto an incoming continuous wave from the reader, the diode detector having an output and an input; communications circuitry including a processor having a digital input and having a modulation control output configured to provide a modulation control signal to the diode detector, the diode detector being configured to modulate the reply signal in response to be modulation control signal; front end circuitry coupled between the diode detector and the communications circuitry, the front end circuitry including a comparator having an output coupled to the digital input of the processor, having a positive input coupled to the output of the diode detector, and having a negative input, the front end circuitry further including a voltage divider having a first resistor coupled between the positive input and the negative input and having a second resistor coupled between the negative input and ground, the front end circuitry further including a capacitor coupled between the negative input and ground, the front end circuitry further including a resistor coupled between the positive input and ground, and the front end circuitry further including circuitry configured to selectively short the capacitor.

Further aspects of the invention provide a modulated backscatter radio frequency identification device comprising an antenna; a diode detector coupled to the antenna, for use in receiving radio frequency data from a reader and in replying to the interrogator by modulating a reply signal onto an incoming continuous wave from the reader, the diode detector having an output and an input; communications circuitry including a processor having a digital input and having a modulation control output configured to provide a modulation control signal to the diode detector, the diode detector being configured to modulate the reply signal in response to be modulation control signal; front end circuitry coupled between the diode detector and the communications circuitry, the front end circuitry including circuitry configured to reject spurious radio frequency signals having an output coupled to the digital input of the processor, having a first input coupled to the output of the diode detector, and having a second input, the front end circuitry further including a voltage divider having a first resistor coupled between the first input and the second input and having a second resistor coupled between the second input and ground, the front end circuitry further including a capacitor coupled between the second input and ground, the front end circuitry further including a resistor coupled between the first input and ground, and the front end circuitry further including a transistor having a control electrode coupled to the modulation control output, having a first power electrode coupled to the second input, and having a second power electrode coupled to ground.

Still further aspects of the invention provide a modulated backscatter radio frequency identification device comprising an antenna; a diode detector coupled to the antenna, for use in receiving radio frequency data from a reader and in replying to the interrogator by modulating a reply signal onto an incoming continuous wave from the reader, the diode detector having an output and an input; communications circuitry including a processor having a digital input and having a modulation control output configured to provide a modulation control signal to the diode detector, the diode detector being configured to modulate the reply signal in response to be modulation control signal; front end circuitry coupled between the diode detector and the communications circuitry, the front end circuitry including a comparator having an output coupled to the digital input of the processor, having a positive input coupled to the output of the diode detector, and having a negative input, the front end circuitry further including a voltage divider having a first resistor coupled between the positive input and the negative input and having a second resistor coupled between the negative input and ground, the front end circuitry further including a capacitor coupled between the negative input and ground, the front end circuitry further including a resistor coupled between the first input and ground, and the front end circuitry further including a transistor having a control electrode coupled to the modulation control output, having a first power electrode coupled to the second input, and having a second power electrode coupled to ground.

BRIEF DESCRIPTION OF THE DRAWINGS

Preferred embodiments of the invention are described below with reference to the following accompanying drawings.

FIG. 1 is a block diagram of an exemplary wireless communication system.

FIG. 2 is a block diagram of components of an exemplary wireless communication device of the system.

FIGS. 3A and 3B provide a circuit schematic representation of components depicted in FIG. 2, in accordance with various embodiments of the invention.

DETAILED DESCRIPTION OF THE PREFERRED EMBODIMENTS

Figure 3:
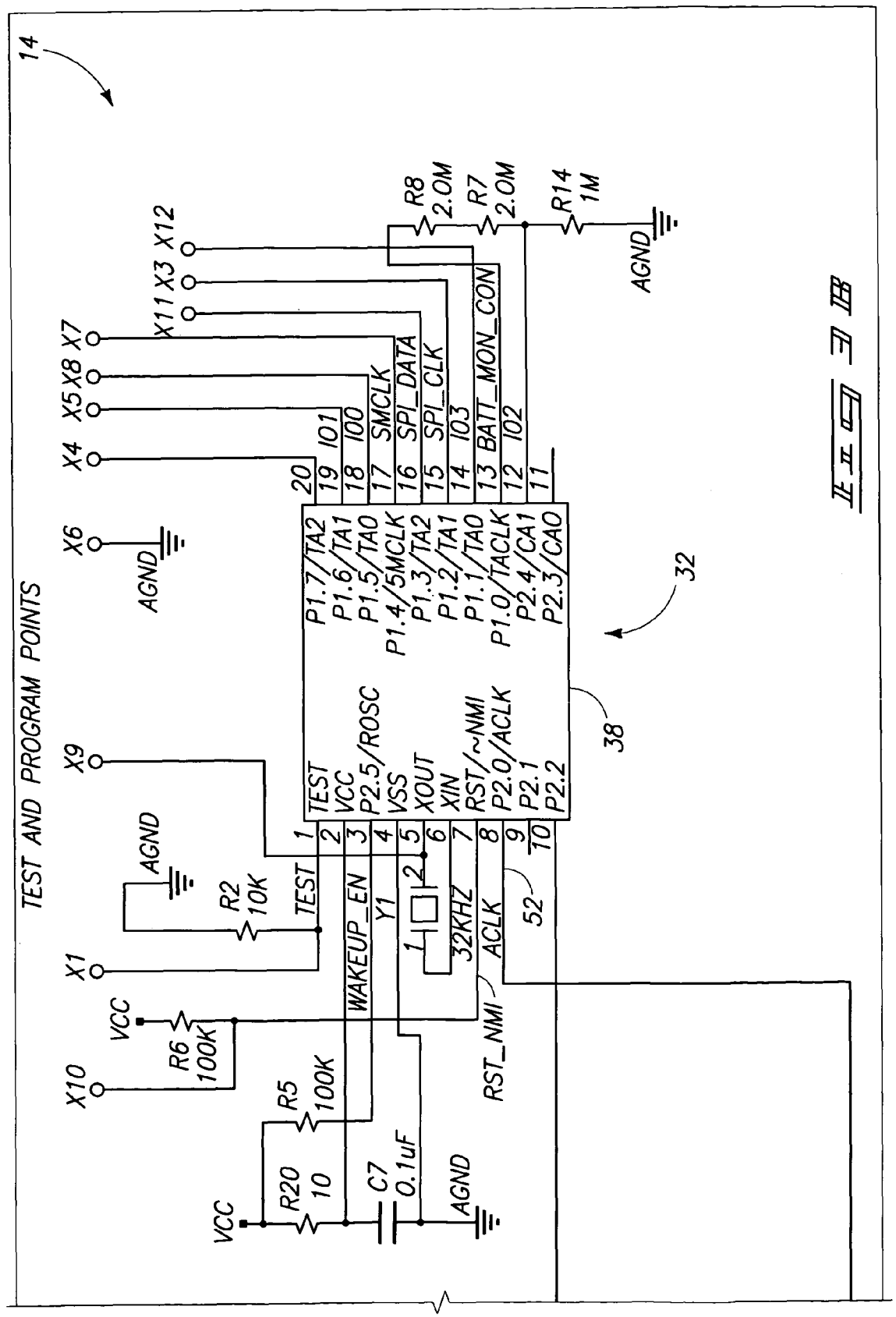
FIGS. 3A and 3B are to be assembled together.

Attention is directed to the following commonly assigned applications, which are incorporated herein by reference: U.S. patent application Ser. No. 10/263,826, filed Oct. 2, 2002, Publication No. 2004-0066752, entitled "Radio Frequency Identification Device Communications Systems, Wireless Communication Devices, Wireless Communication Systems, Backscatter Communication Methods, Radio Frequency Identification Device Communication Methods, and a Radio Frequency Identification Device" by inventors Michael A. Hughes and Richard M. Pratt; U.S. patent application Ser. No. 10/263,809, filed Oct. 2, 2002, Publication No. 2004-0198222, entitled "Method of Simultaneously Reading Multiple Radio Frequency Tags, RF Tag, and RF Reader", by inventors Emre Ertin, Richard M. Pratt, Michael A. Hughes, Kevin L. Priddy, and Wayne M. Lechelt; U.S. patent application Ser. No. 10/263,873, filed Oct. 2, 2002, Publication No. 2004-0066279, entitled "RFID System and Method Including Tag ID Compression", by inventors Michael A. Hughes and Richard M. Pratt; U.S. patent application Ser. No. 10/264,078, filed Oct. 2, 2002, Publication No. 2004-0066281, entitled "System and Method to Identify Multiple RFID Tags", by inventors Michael A. Hughes and Richard M. Pratt; U.S. patent application Ser. No. 10/263,940, filed Oct. 2, 2002, Publication No. 2004-0198233, entitled "Radio Frequency Identification Devices, Backscatter Communication Device Wake-Up Methods, Communication Device Wake-Up Methods and A Radio Frequency Identification Device Wake-Up Method", by inventors Richard Pratt and Michael A. Hughes; U.S. patent application Ser. No. 10/263,997 filed Oct. 2, 2002, Publication No. 2004-0070500, entitled "Wireless Communication Systems, Radio Frequency Identification Devices, Methods of Enhancing a Communications Range of Radio Frequency Identification Device, and Wireless Communication Methods", by inventors Richard Pratt and Steven B. Thompson; U.S. patent application Ser. No. 10/263,670, filed Oct. 2, 2002, Publication No. 2004-0067764, entitled "Wireless Communications Devices, Methods of Processing a Wireless Communication Signal, Wireless Communication Synchronization Methods and a Radio Frequency Identification Device Communication Method", by inventors Richard M. Pratt and Steven B. Thompson; U.S. patent application Ser. No. 10/263,656, filed Oct. 2, 2002, Publication No. 2004-0066280, entitled "Wireless Communications Systems, Radio Frequency Identification Devices, Wireless Communications Methods, and Radio Frequency Identification Device Communications Methods", by inventors Richard Pratt and Steven B. Thompson; U.S. patent application Ser. No. 10/263,635, filed Oct. 4, 2002, Publication No. 2004-0066278, entitled "A Challenge-Based Tag Authentication Model", by inventors Michael A. Hughes and Richard M. Pratt; U.S. patent application Ser. No. 10/269,756, filed Oct. 10, 2002, Publication No. 2004-0203478, entitled RFID Receiver Apparatus and Method, by inventor Jeffrey Wayne Scott; U.S. patent application Ser. No. 09/589,001, filed Jun. 6, 2000, entitled "Remote Communication System and Method", by inventors R. W. Gilbert, G. A. Anderson, K. D. Steele, and C. L. Carrender; U.S. patent application Ser. No. 09/802,408; filed Mar. 9, 2001, entitled "Multi-Level RF Identification System"; by inventors R. W. Gilbert, G. A. Anderson, and K. D. Steele, now U.S. Pat. No. 6,765,476; U.S. patent application Ser. No. 09/833,465, Publication No. 2002-0149468, filed Apr. 11, 2001, entitled "System and Method for Controlling Remote Device", by inventors C. L. Carrender, R. W. Gilbert, J. W. Scott, and D. Clark; U.S. patent application Ser. No. 09/588,997, filed Jun. 6, 2000, entitled "Phase Modulation in RF Tag", by inventors R. W. Gilbert and C. L. Carrender; U.S. patent application Ser. No. 09/589,000, filed Jun. 6, 2000, entitled "Multi-Frequency Communication System and Method", by inventors R. W. Gilbert and C. L. Carrender, now U.S. Pat. No. 6,745,008; U.S. patent application Ser. No. 09/588,998; filed Jun. 6, 2000, entitled "Distance/Ranging by Determination of RF Phase Delta", by inventor C. L. Carrender; U.S. patent application Ser. No. 09/797,539, filed Feb. 28, 2001, entitled "Antenna Matching Circuit", by inventor C. L. Carrender, now U.S. Pat. No. 6,738,025; U.S. patent application Ser. No. 09/833,391, filed Apr. 11, 2001, Publication No. 2002-0149484 A1, entitled "Frequency Hopping RFID Reader", by inventor C. L. Carrender.

Referring to FIG. 1, an exemplary wireless communication system 10 is depicted. The exemplary system 10 includes a first communication device 12 and a plurality of second communication devices 14. First and second communication devices 12, 14 are arranged to implement wireless communications 16 in the depicted exemplary embodiment. Possible wireless communications 16 include first wireless signals 18 communicated from first communication device 12 and second communication signals 20 communicated from respective second communication devices 14.

System 10 is provided to illustrate exemplary structural and method aspects of the present invention. In the illustrated embodiment, system 10 is implemented as a radio frequency identification device (RFID) communications system. For example, in such an arrangement, first communication device 12 may be implemented as a reader or interrogator, and second communication devices 14 may be implemented as transponders, such as RFID tags in some configurations, wireless signals 18 may be referred to as forward link wireless signals and wireless signals 20 may be referred to as return link wireless signals communicated responsive to forward link wireless signals 18. Exemplary wireless communications 16 include electromagnetic signals, such as radio frequency signals.

Referring to FIG. 2, an exemplary arrangement of one of second communication devices 14 is shown. The exemplary configuration of device 14 includes antennas 30 and 31, communication circuitry 32, front end circuitry 34, and energy source 36.

Energy source 36 may comprise any of a plurality of possible configurations corresponding to the implementation of communication device 14. Communication device 14 may be implemented in passive, semi-passive or active configurations in exemplary arrangements.

In semi-passive implementations, energy source 36 may comprise a battery utilized to provide electrical energy to communication circuitry 32 to implement processing of wireless signals 18 while electromagnetic energy received within device 14 is utilized to generate wireless signals 20.

For passive implementations of device 14, received electromagnetic energy is utilized to provide operational electrical energy to components of device 14 as well as provide radio frequency energy for communicating wireless signals 20. In such an implementation, energy source 36 may comprise a power antenna (not shown) and discrete components arranged to convert received electromagnetic energy into usable operational electrical energy.

It may be desired to conserve electrical energy of a battery (if utilized) in order to extend the useful, operational life of the battery. In one embodiment, communication circuitry 32 is arranged to operate in a plurality of operational modes, including at least first, second and third different operational modes in one embodiment. Individual ones of the operational modes have different power requirements and consume electrical energy at different rates. Exemplary operational modes are described in a U.S. patent application Ser. No. 10/263,940, entitled "Radio Frequency Identification Devices, Backscatter Communication Device Wake-up Methods, Communication Device Wake-up Methods and A Radio Frequency Identification Device Wake-up Method," naming Richard Pratt and Mike Hughes as inventors, incorporated herein by reference.

Antennas 30 and 31 are arranged to receive electromagnetic energy including signals 18 and to output electromagnetic energy including signals 20. In alternative embodiments, as shown in the above-incorporated application Ser. No. 10/263,940, a single antenna is employed instead of two antennas. An additional antenna (not shown) may be provided in passive applications to provide operational energy.

Communication circuitry 32 includes a processor 38 according to at least one configuration. An exemplary processor 38 is shown in FIGS. 3A and 3B and may be implemented as a model number MSP430F1121 or MSP430F1121A available from Texas Instruments, Inc. Descriptions of operation of this processor and pin descriptions can be found on Texas Instrument's website. Other processor selections or configurations are possible.

Processor 38 of communication circuitry 32 is configured to execute instructions to control communication operations of device 14. For example, processor 38 of communication circuitry 32 is arranged to process received wireless signals 18 and to control communication of outputted wireless signals 20. In one arrangement, processor 38 is configured to control antenna 30 to generate wireless signals 20 using backscatter modulation communication techniques. Communication circuitry 32 may control outputting of wireless signals 20 using backscatter modulation according to at least one radio frequency identification device communication protocol.

For example, communication circuitry 32 controls electrical characteristics of antennas 30 and 31 according to backscatter embodiments. In some embodiments, the processor 38 provides a modulation signal to alter electrical characteristics of one of the antennas 30, 31 wherein electromagnetic energy is selectively reflected by the antenna. One of the antennas 30, 31 reflects electromagnetic energy to create wireless signals 20, according to some exemplary backscatter implementations.

The modulated signal may be encoded with information to be communicated from device 14 to device 12 (e.g. to a reader). Exemplary information includes identification information, such as a unique serial number which identifies the communicating device 14, or any other desired information to be communicated. According to some exemplary arrangements, communication devices 12, 14 are configured to communicate wireless signals 18, 20 using on/off key (OOK) modulation, such as a FM0 or FM1 encoding scheme. Other types of modulation or schemes may be utilized to communicate information between devices 12, 14.

Communication circuitry 32 arranged to implement RFID communications may be referred to as radio frequency identification device communication circuitry. Communication circuitry 32 may be operable to control communication of wireless signals 20 responsive to processing of one or more commands embodied in wireless signal 18.

Processing of received signals 18 may include extracting an identifier from the wireless signals 18 (e.g., an identifier of the communicating device 12 and\or identifying device 14) and also include processing of commands within signals 18. Responsive to processing, device 14 may selectively output or communicate wireless signals 20 including identification information or other desired requested information from first communication device 12.

Initially, device 12 may output one of signals 18 defining a universal wake-up signal. Such a signal may comprise, for example, a 4 kHz modulated signal. Devices 14 monitor for the reception of the 4 kHz modulated signal wake-up and to enter different operational modes wherein signals 18 may be processed and signals 20 may be communicated.

As illustrated in the exemplary configuration shown in FIGS. 3A and 3B, a 32 kHz crystal may be coupled with pins 5 and 6 of processor 38. Processor 38 may utilize an internal clock divisor to select and provide reference signals of any of multiple possible frequencies. For example, processor 38 may divide by 8 to provide the 4 kHz modulation signal.

Referring to FIGS. 3A and 3B, exemplary circuitry of communication device 14 is shown. The depicted circuitry of FIGS. 3A and 3B illustrates exemplary configurations of antennas 30 and 31, communication circuitry 32, processor 38 and front end circuitry 34. Energy source 36 (not shown in FIGS. 3A and 3B) may be coupled with the illustrated VCC terminals and AGND terminals. The depicted exemplary circuitry of FIGS. 3A and 3B is provided to illustrate possible methodologies and structures which may be utilized to implement aspects of the present invention. Other alternative arrangements and methods are possible.

Radio frequency energy is received via antennas 30, 31 and detector diodes 54, 56, 58, and 60 coupled with respective antennas 30, 31. The diodes rectify incoming RF. The electrical energy applied to a comparator 40 corresponds to the modulation of the signals 18 provided by the first device 12. Comparator 40 operates to reject spurious signals and trigger wake-up functionality described in the U.S. patent application incorporated by reference above (Ser. No. 10/263,940).

The front end circuitry 34 includes comparator 40. The comparator 40 requires a predetermined minimum voltage difference between pin 3 (non-inverting input) and pin 4 (inverting input) to change state. In the illustrated embodiment, the comparator 40 needs to see more than a 5 mV difference between pins 3 and 4 to change state; however, alternative values are possible. The DC voltage on pin 3 of the comparator 40 varies depending on distance between the device 14 and the device 12 because an ON-OFF key (OOK) method of communication is used in the illustrated embodiment, and because the diodes 54, 56, 58, and 60 act as voltage rectifiers. The output of the comparator 40 is a digital signal coupled to digital I/O pin 10 of the processor 38.

The front end circuitry 34 includes a voltage divider defined by resistors R1 and R3. The voltage divider (R3/R1) on pin 4 helps to reduce the effects of the DC voltage variations on pin 3 by biasing pin 4 at one-half the DC voltage on pin 3.

The front end circuitry 34 also includes a capacitor C1. The capacitor C1 helps to average out the instantaneous voltage changes (noise). This also explains poor tag performance at very close ranges since the voltage difference between pins 3 and 4 gets big enough to make it hard to detect the OOK modulation.

The front end circuitry 34 also includes a resistor R17. The resistor R17 sets the load on the detector diode output. The resistor values shown have been selected to optimize the load on the detector diode output; however, other values are possible The value of resistor R1 affects range versus battery life. In the illustrated embodiment, the resistor R1 has been set at 2.0M. Other values, such as 10M, are possible. In this case when not communicating, the DC voltage on pin 4 would be, for example, 83% of pin 3, therefore, very minor RF signals may be able to cause the comparator 40 to change state. A change in state of the comparator causes the processor 38 to wake-up, and process the incoming signal.

The output of the comparator 40 follows the voltage difference between pins 3 and 4 (its output goes from ground to Vcc) whenever the voltage difference exceeds, for example, ~5 mV. The output of the comparator 40 is a digital value, and is coupled to digital I/O pin 10 of the processor 38.

Operation of the processor 38, in accordance with some embodiments, will now be described. In some embodiments, the processor 38 has a sleep mode and an awake mode.

In these embodiments, when the comparator 40 is inactive, the processor 38 is asleep.

When the comparator 40 changes state, the processor 40 reacts to the state change by interrupt. In some embodiments, on a predetermined comparator transition, e.g., the first transition, the processor 38 wakes up to full speed.

The processor 38 begins to measure the period associated with the incoming synchronizing pulses. The period is measured using counters internal to the processor 38 and the I/O pin 10 interrupt. In some embodiments, if the synchronizing data rate does not meet prescribed period limits, the processor 38 goes back to sleep.

In some embodiments, if the synchronizing data rate does meet prescribed period limits:
(a) The processor 38 continues to sample the incoming data using the measured period and, if there is an error (e.g., no data), the processor goes to sleep;
(b) If no error, in some embodiments, the CRC bits are tested. If there is an error in the CRC bits, the processor 38 goes to sleep;
(c) If no error in the CRC bits, the command portion of the data from the reader is executed;
(d) The device 14 responds to the command; and
(e) The processor 38 goes to sleep.

Some prior RFID tag front end designs have been a compromise between tag receive sensitivity and the quality of backscatter modulation that the tag was able to produce due to the choice of the front end component values. For superior tag receive sensitivity, the tag has not been able to produce full depth modulation in some designs. When the tag cannot produce full depth modulation for the length of its entire response to the reader, the tag cannot be read at the maximum distance that would be possible if it did produce full depth modulation for the length of its response.

Some embodiments of the invention provide the addition of a component to the front end circuitry 34 of an existing design of device 14, which enables full depth modulation for the entire length of the device's backscattered response message back to the device 12.

More particularly, the inclusion of a transistor 42 in the front end circuitry 34 makes full depth modulation realizable in the device 14. While other embodiments are possible, in the illustrated embodiment, the transistor N Channel Metal-Oxide-Semiconductor-Field-Effect-Transistor (MOSFET) such as the Vishay Siliconix TNO200T/TS.

Drain 44 of the transistor 42 is coupled to negative (inverting) input 46 of the front end comparator 40. Source 48 of the transistor 42 is coupled to circuit ground AGND of the device 14, in the illustrated embodiment. Low or negative voltages could be employed, instead of ground, in alternative embodiments. Gate 50 of the transistor 42 is coupled to a modulation control line 52 of the processor 38. When the device 14 modulates, the transistor 42 keeps the negative input 46 of the comparator 40 at relative ground during the positive alternation of the modulation waveform instead of allowing capacitor C1 to gradually charge from the modulation. The charging of capacitor C1 is the action that raises the bottom or reduces the depth of modulation. The transistor 42 holds this line at relative ground during the positive of the modulation cycle, for the entire length of the modulation cycle, allowing for the largest possible modulation transitions from the device 14. The larger the amplitude of the modulation transitions, the longer the range from which the device 14 can be successfully read by the device 12.

The capacitor Cl is shorted whenever the line 52 labeled ACLK is HIGH. If the transistor 42 were not installed in the circuit, the voltage on capacitor C1 would come to a quiescent level above ground due the action of the detector diodes 54, 56, 58, and 60. The device 12 is constantly transmitting RF when the device 14 is trying to communicate back to the device 12.

Consider only the antenna and detector diodes while the device 12 (e.g., a reader) is transmitting a continuous wave and the device 14 (e.g., a tag) is communicating back to the device 12. The tag communicates by forward-biasing and then removing the forward bias on the detector diodes 54, 56, 58, and 60, but the diodes are still rectifying the incoming RF. So the detector diode output continues to increase in voltage as data is transmitted. The depth of modulation is a function of the change in voltage applied to the antenna or antennas 30, 31 through the detector diodes 54, 56, 58, and 60. By keeping the voltage on capacitor C1 as low as possible, maximum modulation depth is achieved.

Laboratory tests have shown that employing this transistor on the device 14 improves the backscatter performance of the device 14 by a minimum of 3 dBm. All backscatter message lengths benefit from this modification, but the improvements are much more apparent with longer backscatter responses which are required by some applications. Without this modification, it would be difficult to read longer backscatter messages from the device 14 at anything other than minimal ranges.

This modification has immediate applications on, for example, semi-passive modulated backscatter RFID tags to optimize the depth of their backscatter modulation.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A modulated backscatter radio frequency identification device comprising:
    a diode detector configured to provide a data signal as a result of electromagnetic energy received by the radio frequency identification device and to selectively modulate a reply signal onto an incoming continuous wave;
    communications circuitry configured to process the data signal and to provide a modulation control signal to the diode detector, the diode detector being configured to modulate the reply signal in response to the modulation control signal; and
    circuitry configured to increase impedance change at the diode detector which would otherwise not occur because the diode detector rectifies the incoming continuous wave while modulating the reply signal, whereby reducing the rectified signal increases modulation depth by removing the reverse bias effects on impedance changes.

2. A modulated backscatter radio frequency identification device in accordance with claim 1 wherein the circuitry configured to increase impedance change comprises a transistor.

3. A modulated backscatter radio frequency identification device in accordance with claim 1 wherein the communications circuitry is configured to extract an identifier of the radio frequency identification device from the data signal to process the data signal.

4. A modulated backscatter radio frequency identification device in accordance with claim 1 wherein the circuitry configured to increase impedance change comprises a transistor having a control electrode coupled to be controlled by the modulation control signal.

5. A modulated backscatter radio frequency identification device in accordance with claim 1 wherein the circuitry configured to increase impedance change comprises a transistor having a control electrode coupled to the modulation control signal, a first power electrode coupled to the diode detector, and a second power electrode coupled to ground.

6. A method of improving depth of modulation in a modulated backscatter radio frequency identification device including a diode detector configured to selectively modulate a reply signal onto an incoming continuous wave and communications circuitry configured to provide a modulation control signal to the diode detector, the diode detector being configured to modulate the reply signal in response to the modulation control signal, the method comprising:
    increasing impedance change at the diode detector which would otherwise not occur because the diode detector rectifies the incoming continuous wave while modulating the reply signal, whereby reducing the rectified signal increases modulation depth by removing the reverse bias effects on impedance changes.

7. A method in accordance with claim 6 wherein only one component is added to increase impedance change.

8. A method in accordance with claim 7 wherein the component is a transistor.

9. A method in accordance with claim 6 further comprising:
    using the diode detector, providing a data signal as a result of electromagnetic energy received by the radio frequency identification device; and
    using the communications circuitry, processing the data signal.

10. A method in accordance with claim 6 wherein impedance change is increased using a transistor having a control electrode coupled to be controlled by the modulation control signal.

11. A method in accordance with claim 6 wherein the impedance change is increased using a transistor having a control electrode coupled to the modulation control signal, a first power electrode coupled to the diode detector, and a second power electrode coupled to ground.

12. A modulated backscatter radio frequency identification device comprising:
    an antenna;
    a diode detector coupled to the antenna and configured to receive radio frequency data from a reader and to reply to the reader by modulating a reply signal onto an incoming continuous wave from the reader, the diode detector having an output and an input;
    communications circuitry including a processor having a digital input and having a modulation control output configured to provide a modulation control signal to the diode detector, the diode detector being configured to modulate the reply signal in response to be modulation control signal;
    front end circuitry coupled between the diode detector and the communications circuitry, the front end circuitry including a comparator having an output coupled to the digital input of the processor, having a positive input coupled to the output of the diode detector, and having a negative input, the front end circuitry further including a capacitor coupled between the negative input and ground, and the front end circuitry further including circuitry configured to selectively short the capacitor.

13. A modulated backscatter radio frequency identification device in accordance with claim 12 wherein the circuitry configured to short the capacitor is arranged to reduce voltage build up at the diode detector which would otherwise occur because the diode detector rectifies the incoming continuous wave while modulating the reply signal, whereby modulation depth is increased.

14. A modulated backscatter radio frequency identification device in accordance with claim 12 wherein the circuitry configured to selectively short the capacitor comprises a transistor.

15. A modulated backscatter radio frequency identification device in accordance with claim 12 wherein the circuitry configured to selectively short the capacitor shorts the capacitor from time to time.

16. A modulated backscatter radio frequency identification device in accordance with claim 12 wherein the circuitry configured to selectively short the capacitor comprises a MOSFET transistor.

17. A modulated backscatter radio frequency identification device in accordance with claim 12 wherein the circuitry configured to selectively short the capacitor comprises a MOSFET transistor having a gate coupled to the modulation control output.

18. A modulated backscatter radio frequency identification device in accordance with claim 12 further comprising a voltage divider having a first resistor coupled between the positive input and the negative input and having a second resistor coupled between the negative input and ground.

19. A modulated backscatter radio frequency identification device in accordance with claim 12 wherein the circuitry configured to selectively short the capacitor comprises a transistor having a control electrode coupled to the modulation control output, a first power electrode coupled to the diode detector, and a second power electrode coupled to ground.

20. A modulated backscatter radio frequency identification device comprising:
an antenna;
a diode detector coupled to the antenna and configured to receive radio frequency data from a reader and to reply to the reader by modulating a reply signal onto an incoming continuous wave from the reader, the diode detector having an output and an input;
communications circuitry including a processor having a digital input and having a modulation control output configured to provide a modulation control signal to the diode detector, the diode detector being configured to modulate the reply signal in response to be modulation control signal;
front end circuitry coupled between the diode detector and the communications circuitry, the front end circuitry including circuitry configured to reject spurious radio frequency signals having an output coupled to the digital input of the processor, having a first input coupled to the output of the diode detector, and having a second input, the front end circuitry further including a capacitor coupled between the second input and ground, and the front end circuitry further including a transistor having a control electrode coupled to the modulation control output, having a first power electrode coupled to the second input, and having a second power electrode coupled to ground.

21. A modulated backscatter radio frequency identification device in accordance with claim 20 wherein the circuitry configured to reject spurious radio frequency signals comprises a comparator having a positive input defining the first input and having a negative input defining the second input.

22. A modulated backscatter radio frequency identification device in accordance with claim 20 wherein the transistor, in operation, shorts the capacitor from time to time.

23. A modulated backscatter radio frequency identification device in accordance with claim 20 wherein the transistor is a MOSFET transistor.

24. A modulated backscatter radio frequency identification device comprising:
an antenna;
a diode detector coupled to the antenna and configured to receive radio frequency data from a reader and to reply to the reader by modulating a reply signal onto an incoming continuous wave from the reader, the diode detector having an output and an input;
communications circuitry including a processor having a digital input and having a modulation control output configured to provide a modulation control signal to the diode detector, the diode detector being configured to modulate the reply signal in response to be modulation control signal;
front end circuitry coupled between the diode detector and the communications circuitry, the front end circuitry including a comparator having an output coupled to the digital input of the processor, having a positive input coupled to the output of the diode detector, and having a negative input, the front end circuitry further including a capacitor coupled between the negative input and ground, and the front end circuitry further including a transistor having a control electrode coupled to the modulation control output, having a first power electrode coupled to the negative input, and having a second power electrode coupled to ground.

25. A modulated backscatter radio frequency identification device in accordance with claim 24 wherein the transistor, in operation, shorts the capacitor from time to time.

26. A modulated backscatter radio frequency identification device in accordance with claim 20 wherein the diode detector is configured to output a data signal comprising the data as a result of the receiving the radio frequency data from the reader, and the communications circuitry is configured to process the data signal.

* * * * *